March 24, 1970
J. C. BANDIMERE
3,501,843
FEELER GAUGE ASSEMBLY
Filed Dec. 7, 1967
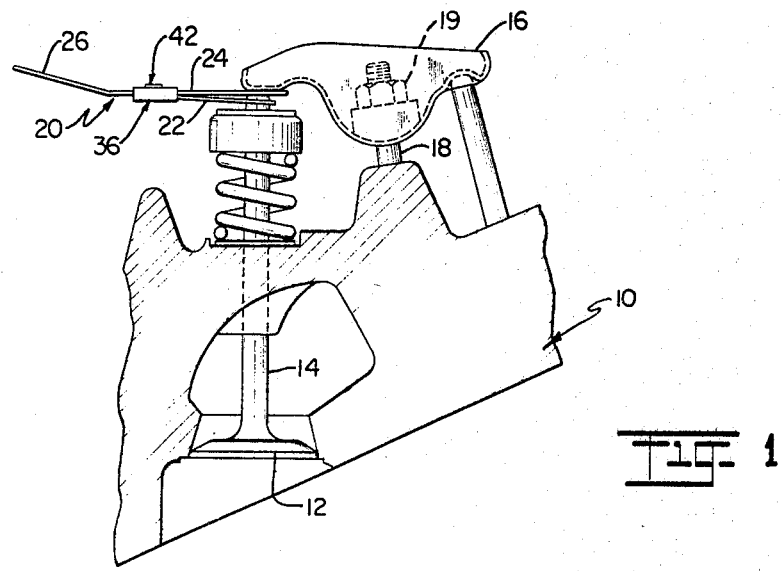
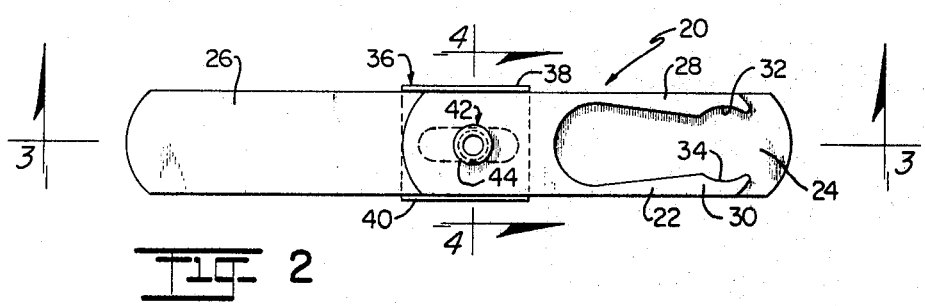
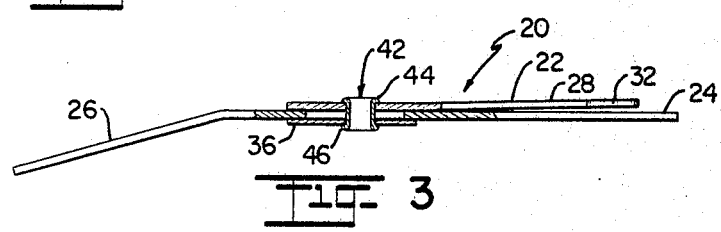
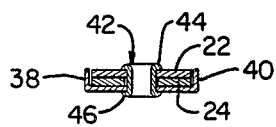
INVENTOR.
JOHN C. BANDIMERE
BY *Sheridan and Ross*
ATTORNEYS

United States Patent Office 3,501,843
Patented Mar. 24, 1970

---

3,501,843
FEELER GAUGE ASSEMBLY
John C. Bandimere, 3740 Fenton St.,
Wheatridge, Colo. 80033
Filed Dec. 7, 1967, Ser. No. 688,851
Int. Cl. G01b 3/30
U.S. Cl. 33—181          9 Claims

ABSTRACT OF THE DISCLOSURE

The invention is a feeler gauge assembly including the feeler gauge and support structure therefor adapted to snap onto a valve stem to hold the feeler gauge in gauging position between the tappet and the end of the valve stem.

SUMMARY OF THE INVENTION

This invention relates to an assembbly of a feeler gauge and a support element for supporting the gauge while in use.

Feeler gauges in the form of flat plates are used widely for adjusting the gap, lash or play between cooperating parts of various mechanisms, the thickness of the plate represneting the predetermined allowable gap or lash between the parts. They are particularly useful for valve tappet adjustments in internal combustion engines where an accurate predetermined valve lash is required. In accordance with prior procedures, the feeler gauge is held by hand between the cooperaing parts, such as the end of the valve stem and the tappet or rocker arm. The disadvantages of this procedure are that there is danger of the operator being burned by hot surfaces in the proximity of the working area, both hands may be needed for adjustment of parts determining the width of the gap or, more importantly, when adjustments are being made for a number of valve tappets or rocker arms wherein uniformity of valve lash is required, there is no way of insuring that the feeler gauge is supported in the same orientation or relative position with the center of each valve stem while the respective adjustments are being made to provide for uniformity of gap width.

Accordingly, it is an object of this invention to provide a feeler gauge assembly providing support means for the feeler gauge by which it may be attached to a support each time it is used to insure that it is used in the same orientation each time.

It is another object of this invention to provide support means in a feeler gauge assembly which can be attached directly to the end of the valve stem while in use.

It is a further object of this invention to provide a feeler gauge assembly, including a support for the gauge, which comprises a minimum number of parts, can be inexpensively manufactured, and is simple in operation.

The above and other objects are provided by a feeler gauge assembly comprised of a feeler gauge to which is slidably attached a flat plate elongated support member bifurcated at one end to provide gripping arms for gripping the body of the valve stem. In the preferred modification of the assembly, the feeler gauge is provided with a guide slot and is located between the support element and a guide plate which holds the feeler gauge and the support element in alignment along their longitudinal axes, the support element and the guide plate being connected by a guide pin extending through the guide slot.

The invention is best explained by reference to the accompanying drawings hereby made a part of this specification, and in which:

FIGURE 1 is a cutaway view partially in section of that area of an internal combustion engine incorporating a valve and tappet or rocker arm assembly, showing the feeler gauge assembly mounted in position for adjustment of the valve lash between the rocker arm and the end of the valve stem.

FIGURE 2 is a bottom view of the feeler gauge assembly of this invention.

FIGURE 3 is a fragmentary sectional view of the feeler gauge assembly taken on the line 3—3 of FIG. 2.

FIGURE 4 is cross-sectional view of the feeler gauge assembly of the invention taken on line 4—4 of FIG. 2.

Referring now to the drawings, there is shown in FIG. 1 a section of a conventional internal combustion engine 10 having mounted therein valve element 12 supported on valve stem 14, and valve rocker arm 16 positioned for actuation of valve 12 in accordance with well know conventional construction. The space between the upper end of valve stem 14 and the adjacent area of rocker arm 16 determines the gap, lash or play between the end of the stem and the rocker arm. The width of the gap is adjusted by movement of the rocker arm on its stem 18 toward and away from the end of the valve stem 14 by adjustment of nut 19. Other conventional means of adjusting clearance, such as, elongation of the push rod or tappet may be used depending upon the construction involved. The feeler gauge assembly of the invention, represented by the numeral 20, is shown in position for adjustment of the gap with support element 22 locked over valve stem 14 and supporting feeler gauge 24 in measuring position.

Referring now to FIG. 2, the support member 22 is shown slideably mounted on the feeler gauge 24. The feeler gauge is provided with a handle 26 in this case being an integral extension of the gauge 24.

The feeler gauge is a flat elongated plate-like structure made of metal, preferably spring steel, and its structure in which its length and width far exceed its thickness makes it resilient. Likewise, the support element 22 is a flat plate-like structure of metal which by virtue of its thinness with respect to its length and width is also resilient. For providing gripping means for gripping the valve stem 14, the support element 22 is bifurcated at its forward end (the measuring end of the feeler gauge) into a pair of legs 28 and 30. Each of these legs at its forward end has a cut-out portion 32 and 34, respectively, adapted to grip a circular surface, such as, a valve stem. The use of the bifurcated end to provide the gripping arms, and the gripping arms themselves with their cutout portions, are merely an example of the preferred modification of gripping means on the support element. Obviously, spring biased arms, or other type gripping means could be used.

With further reference to FIGS. 3 and 4, a guide plate 36 having depending flanges 38 and 40 is secured to the support element 22 and the feeler gauge 24 by means of guide pin 42 provided with flanged and swaged edges 44 and 46 at either end to hold the assembly together. In accordance with this construction, the feeler gauge is mounted between the guide plate and the support element with the flanges 38 and 40 of the guide plate cooperating with the edges of the support element and the feeler gauge to hold them in alignment along their longitudinal axes. In accordance with the described construction, the guide plate 36 is attached by guide pin 42 to the support element 22 to move with it relative to the feeler gauge. The guide plate is also made of metal, such as, stainless steel.

Alternate equivalent constructions for the assembly include the mounting of the support element 22 and the guide plate 36 on the same side of the feeler gauge or permanently securing the guide plate in position to the edges of the feeler gauge so that the support element 22 moves relative to it.

In operation, the assembly is positioned as shown in FIG. 1 with the gripping arms 28 and 30 gripping the valve stem 14 near the end so that the gauge 24 is positioned in the gap between the end of the valve stem and the adjacent surface of the rocker arm 16. The assembly remains in this position while the adjustment of the lash between the end of the valve stem and the rocker arm or valve tappet is being made. It can readily be seen that by use of the assembly the same sector of the feeler gauge is always used for measuring the adjustment so that the lash is uniform for all of the valves being adjusted. Further, use of the assembly leaves both hands of the operator free for adjustment of the rocker arm or valve tappet while the adjustment is being made. Assemblies can be supported at the same time on various valves thereby leaving the mechanic free to investigate other valve lash noises for adjustment of other valves.

In positioning the support element 22 around the valve stem 14, the front section of the gripping arms 28 and 30 is brought into contact with the valve stem and forward pressure is applied until the resilient arms 28 and 30 spring outwardly to slip over the stem 14. Likewise, in removing the support element 22 from the valve stem 14 a backward pull on the assembly causes the arms 28 and 30 to spring outwardly to permit the support element to slip off the stem. While the assembly is in operating position the feeler gauge 14 is supported in a substantially horizontal orientation by the support element 22 as shown in FIG. 1.

The above description clearly indicates that the invention provides a feeler gauge assembly incorporating a support means which supports a feeler gauge in the proper position in the space gap being adjusted. The feeler gauge is so supported in the space gap that the same area of the gauge is used for each adjustment and the gauge is in the same orientation when each adjustment is made so that a uniform space gap can be obtained for all valves being adjusted. The assembly is simple in construction and operation and can be manufactured by inexpensive manufacturing procedures.

I claim:
1. A feeler gauge assembly comprising: a feeler gauge element having a front end for measuring the width of a gap and a rear end; a support element for said gauge element having a front end with gripping means for attachment to a support and a rear end; said elements being connected together with their respective front and rear ends adjacent and for relative movement therebetween along an axis passing from their front to rear ends; whereby said gauge element can be positioned with its forward end extending beyond the forward end of said support element when said support element is attached to a support for insertion in a gap to be measured,

2. The assembly of claim 1 in which said grapping means are legs or prongs defined by a longitudinally extending slot in said attachment element closed at one end and open at the other end.

3. The assembly of claim 1 including a handle for said gauge assembly.

4. The assembly of claim 3 in which said handle is constructed integral with said feeler gauge.

5. The assembly of claim 1 including guide means cooperating with said gauge member and said attachment element for maintaining them in alignment along their horizontal axes.

6. The assembly of claim 5 in which said gauge member is provided with a guide slot; said attachment element is connected to said gauge member by a guide pin extending through said slot; and said guide means comprises a body portion having depending guide flanges cooperating with the edges of said gauge member and said attachment element to maintain them in alignment along their longitudinal axes.

7. The assembly of claim 6 in which said guide member is attached to said attachment element.

8. The assembly of claim 5 in which said gauge member is provided with a guide slot; said guide means and said attachment element are on opposite sides of said gauge member and connected by a guide pin extending through said guide slot; and said guide means comprises a body portion having depending guide flanges cooperating with the edges of said guage member and said attachment element to maintain them in alignment along their horizontal axes.

9. The assembly of claim 8 in which said guide pin is swaged at either end to hold said assembly together.

References Cited
UNITED STATES PATENTS

| | | | |
|---|---|---|---|
| 1,562,332 | 11/1925 | Jaques. | |
| 1,935,131 | 11/1933 | Schotthoefer. | |
| 2,158,313 | 5/1939 | Von Hofe | 33—185 |
| 2,200,453 | 5/1940 | Lizakowski. | |
| 2,534,333 | 12/1950 | Wyrick | 33—185 X |
| 2,817,151 | 12/1957 | Knudsen et al. | |
| 3,104,473 | 9/1963 | Rose. | |
| 2,580,495 | 1/1952 | Woods. | |

WILLIAM D. MARTIN, JR., Primary Examiner

U.S. Cl. X.R.

7—1; 81—3; 33—168